United States Patent
Powers et al.

(10) Patent No.: US 12,489,759 B2
(45) Date of Patent: *Dec. 2, 2025

(54) CLEARING HOUSE VALIDATION

(71) Applicant: Global Business Software Development Technologies, Inc., Granbury, TX (US)

(72) Inventors: Michael W. Powers, Lubbock, TX (US); Jeffrey V. Ross, Granbury, TX (US); Stephen P. Frisbie, Lubbock, TX (US)

(73) Assignee: Global Business Software Development Technologies, Inc., Granbury, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,576

(22) Filed: Jun. 18, 2024

(65) Prior Publication Data

US 2024/0340290 A1    Oct. 10, 2024

Related U.S. Application Data

(63) Continuation of application No. 17/643,007, filed on Dec. 7, 2021, now Pat. No. 12,047,389.

(Continued)

(51) Int. Cl.
*H04L 9/40* (2022.01)
*H04L 65/1104* (2022.01)
(Continued)

(52) U.S. Cl.
CPC .......... *H04L 63/12* (2013.01); *H04L 65/1104* (2022.05); *H04L 69/08* (2013.01);
(Continued)

(58) Field of Classification Search
CPC ..... H04L 63/12; H04W 12/069; H04M 3/436; H04M 2203/6045
(Continued)

(56) References Cited

U.S. PATENT DOCUMENTS 5,706,286 A * 1/1998 Reiman ................ H04Q 3/0025
370/467
2019/0238672 A1  8/2019 Powers
(Continued)

FOREIGN PATENT DOCUMENTS

CN        111130892 A    5/2020
EP         1113677 A2    7/2001

OTHER PUBLICATIONS

ATIS-1000095, Extending STIR/SHAKEN over TDM, Alliance for Telecommunications Industry Solutions, Jun. 25, 2021.

(Continued)

*Primary Examiner* — Rasha S Al Aubaidi
*Assistant Examiner* — Jirapon Tulop
(74) *Attorney, Agent, or Firm* — Baker Botts L.L.P.

(57) ABSTRACT

In one embodiment, a network interface receives a communication request. A processor then verifies caller information in the communication request with a certification procedure. The processor obtains a first indicator based on the certification procedure. The first indicator includes information associated with a first certificate management procedure. The processor generates a second indicator based on the first indicator. The second indicator includes information associated with a second certificate management procedure.

17 Claims, 4 Drawing Sheets

Related U.S. Application Data

(60) Provisional application No. 63/122,260, filed on Dec. 7, 2020.

(51) Int. Cl.
*H04L 69/08* (2022.01)
*H04M 3/436* (2006.01)
*H04W 12/069* (2021.01)
*G06Q 30/018* (2023.01)

(52) U.S. Cl.
CPC ......... *H04M 3/436* (2013.01); *H04W 12/069* (2021.01); *G06Q 30/0185* (2013.01); *H04M 2203/6045* (2013.01)

(58) Field of Classification Search
USPC .......................................................... 455/415
See application file for complete search history.

(56) References Cited

U.S. PATENT DOCUMENTS

| | | | |
|---|---|---|---|
| 2020/0028690 | A1 | 1/2020 | Barakat et al. |
| 2020/0221302 | A1* | 7/2020 | Filart ................ H04L 65/1104 |
| 2021/0099573 | A1 | 4/2021 | van Rensburg et al. |
| 2021/0360402 | A1 | 11/2021 | Powers |

OTHER PUBLICATIONS

ATIS-1000096, Signature-based Handling of Asserted Information using ToKENS [SHAKEN]: Out-of-Band PASSporT Transmission Involving TDM Networks, Alliance for Telecommunications Solutions, Jul. 15, 2021.
ATIS-1000097, Technical Report on Alternatives for Call Authentication for Non-IP Traffic, Alliance for Telecommunications Industry Solutions, Jul. 15, 2021.
RFC 8224, Authenticated Identity Management in the Session Initiation Protocol (SIP), Internet Engineering Task Force (IETF), Feb. 2018, available at https://datatracker.ietf.org/doc/html/rfc8224.
RFC 8225, PASSporT: Personal Assertion Token, Internet Engineering Task Force (IETF), Feb. 2018, available at https://datatracker.ietf.org/doc/html/rfc8225.
RFC 8226, Secure Telephone Identity Credentials: Certificates, Internet Engineering Task Force (IETF), Feb. 2018, available at https://datatracker.ietf.org/doc/html/rfc8226.
PCT Notification of Transmittal of the Intl. Search Report and the Written Opinion of the Intl. Searching Authority, or the Declaration, mailed Feb. 25, 2022, re Intl. Appln. No. PCT/US2021/072784.
PCT Notification of Transmittal of the Intl. Search Report and the Written Opinion of the Intl. Searching Authority, or the Declaration, mailed Feb. 25, 2022, re Intl. Appln. No. PCT/US2021/072785.
European Patent Office, Communication Dec. 2, 2024, extended European search report Appln. 24204218.2-1218/4465673.

\* cited by examiner

CLEARING HOUSE VALIDATION

PRIORITY

This nonprovisional application is a continuation, under 35 U.S.C. § 120, of U.S. patent application Ser. No. 17/643,007 filed on Dec. 7, 2021, and entitled "Clearing House Validation," which claims priority to U.S. Provisional Patent Application No. 63/122,260 filed Dec. 7, 2020, each of which is hereby incorporated by reference in their entirety.

TECHNICAL FIELD

Certain embodiments of the present disclosure relate generally to communications networks, and more particularly to providing clearing house validation associated with such communications networks.

BACKGROUND

Networked devices have become ubiquitous in modern day society. Countless individuals communicate with one another using networked devices. Moreover, individuals may communicate domestically or internationally, or may even communicate over their networked devices when travelling abroad. The increased complexity and availability of communications networks has led to an increased susceptibility of fraudulent activity. Fraudulent activity is an enormous threat to the telecommunication industry, especially because network operators across the world tend to earn a significant portion of revenue based on the source and destination of calls originating from another network operator. Network operators lack reliable methods for verifying whether communications originating from another network operator or another network operating on a different signaling protocol can be trusted. According to embodiments of the present disclosure, disadvantages and problems associated with existing communications networks may be reduced or eliminated.

SUMMARY OF PARTICULAR EMBODIMENTS

In accordance with a particular embodiment of the present disclosure, a network interface receives a communication request over a communication link of a first network according to a first signaling protocol. A processor then verifies caller information in the communication request with a certification procedure. The processor converts the communication request to a second signaling protocol used in a second network. The processor may transmit the converted communication request according to the second signaling protocol.

In accordance with a particular embodiment of the present disclosure, a method comprises receiving a communication request from a first network according to a first signaling protocol. The method then verifies caller information in the communication request with a certification procedure. The method converts the communication request to a second signaling protocol used in a second network and transmits the converted communication request according to the second signaling protocol.

In accordance with particular embodiments of the present disclosure, a non-transitory computer readable medium comprises logic that when executed by a processor is operable to receive a communication request from a first network according to a first signaling protocol. The computer readable medium then verifies caller information in the communication request with a certification procedure. The computer readable medium converts the communication request to a second signaling protocol used in a second network and transmits the converted communication request according to the second signaling protocol.

In accordance with a particular embodiment of the present disclosure, a network interface receives a communication request. A processor then verifies caller information in the communication request with a certification procedure. The processor obtains a first indicator based on the certification procedure. The first indicator includes information associated with a first certificate management procedure. The processor generates a second indicator based on the first indicator. The second indicator includes information associated with a second certificate management procedure.

In accordance with a particular embodiment of the present disclosure, a method comprises receiving a communication request. The method then verifies caller information in the communication request with a certification procedure. The method obtains a first indicator based on the certification procedure. The first indicator includes information associated with a first certificate management procedure. The method generates a second indicator based on the first indicator. The second indicator includes information associated with a second certificate management procedure.

In accordance with particular embodiments of the present disclosure, a non-transitory computer readable medium comprises logic that when executed by a processor is operable to receive a communication request. The computer readable medium then verifies caller information in the communication request with a certification procedure. The computer readable medium obtains a first indicator based on the certification procedure. The first indicator includes information associated with a first certificate management procedure. The computer readable medium generates a second indicator based on the first indicator. The second indicator includes information associated with a second certificate management procedure.

Certain embodiments of the present disclosure may provide one or more technical advantages. A technical advantage of one embodiment includes decreasing network congestion and enabling higher throughput from networked devices by alleviating fraudulent communications or requests and decreasing the processing demand on elements of a communications network. As another example, a technical advantage of one embodiment includes improving the communication quality of networked devices in a servicing area, improving network security and signaling protocols, and improving the processing power of a network. As another example, a technical advantage of one embodiment includes improving network security and alleviating fraudulent communications or requests across different service providers, network types, and signaling protocols. As another example, a technical advantage of one embodiment includes enabling communication across different service providers, network types, and signaling protocols. Another technical advantage of one embodiment includes enabling interworking between networks or devices that operate according to different certificate management or call validation procedures.

Other technical advantages of the present disclosure will be readily apparent to one skilled in the art from the following description and the appendix. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Figure 1:
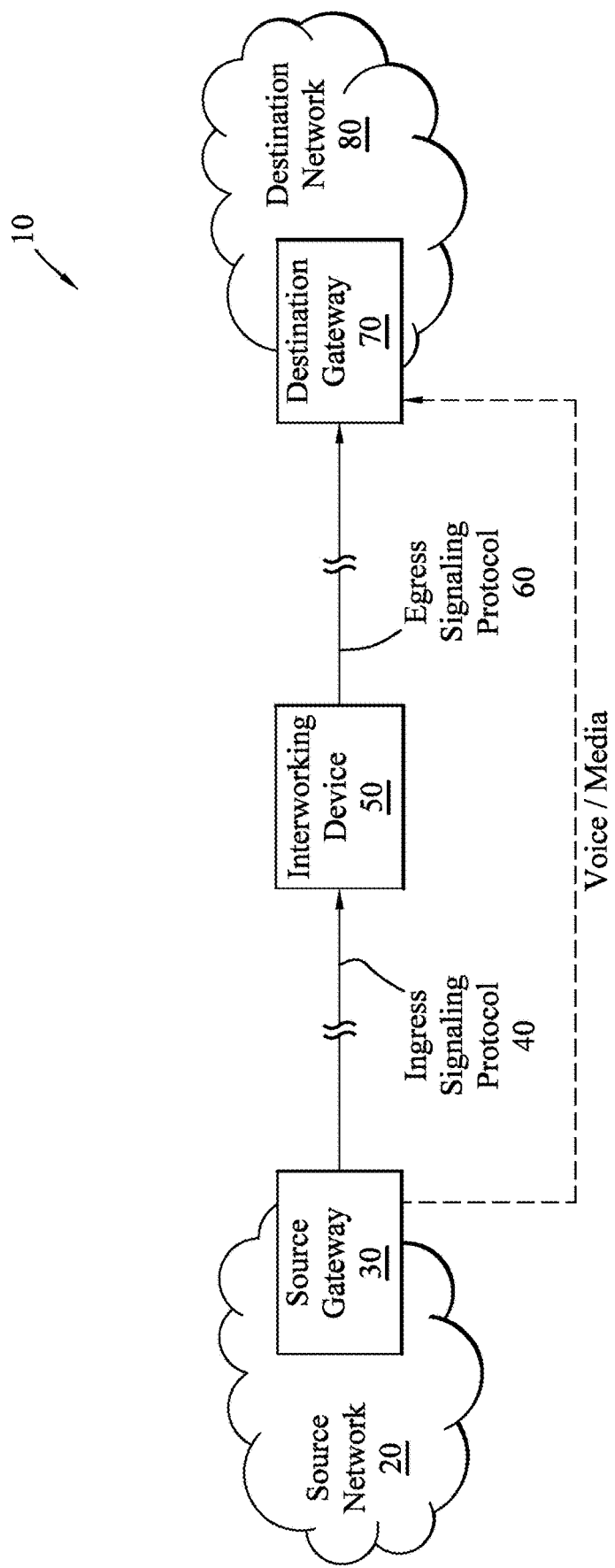
FIG. 1 illustrates a communication system in which an interworking device has been installed.

Embodiments of the present disclosure and its advantages are best understood by referring to FIGS. 1-4, like numerals being used for like and corresponding parts of the various drawings.

The teachings of this disclosure recognize that it would be desirable to provide a system, apparatus, and method that applies certain policy rules to one or more characteristics associated with a communication request. This system would reduce or eliminate the technical problem of calls attempting to enter a communication network with falsified caller information. Furthermore, this system would reduce or eliminate tampering with a caller-ID to disguise the caller's identity, known as call "spoofing."

The teachings of this disclosure also recognize that it would be desirable to provide a system, apparatus, and method that, when receiving a communication request, would verify caller information for communications that are routed between networks using different signaling protocols, networks using different certification procedures, or networks operated by different service providers. For example, a system may receive a communication or communication request via a signaling or communication protocol, use a certification procedure to verify caller information, and modify or convert the communication or communication request to another signaling or communication protocol. A system, apparatus, and method may verify caller information with a certification procedure before or after modifying or converting a communication request to another signaling protocol. In certain embodiments, a system or method may receive a communication or communication request via one signaling or communication protocol, store caller information (e.g., including certificate management or call validation information) based on the received communication or communication request, and provide stored caller information to a network upon a verification request. In certain embodiments, the signaling or communication protocol for the verification request or provision of stored caller information may differ from the signaling or communication protocol for the communication or communication request.

The teachings of this disclosure also recognize that it would be desirable to provide a system, apparatus, and method that obtains one or more indicators to facilitate verifying caller information for communications that are routed between networks using different signaling protocols, networks using different certification procedures, or networks operated by different service providers. For example, a system may receive a communication or communication request, use a certification procedure to verify caller information, and obtain an initial indicator based on the certification procedure. The initial indicator may permit call verification according to a certificate management procedure. In certain embodiments, the initial indicator may be obtained from applying policy rules to characteristics associated with a communication request. A system, apparatus, and method may generate another indicator based on the initial indicator. The other indicator may permit call validation according to a certificate management procedure. In certain embodiments, the certificate management procedure for the initial indicator may differ from the certificate management procedure for the other indicator. A system, apparatus, and method may store or transmit either or both indicators. A system, apparatus, and method may attach either indicator to a communication request or provide either indicator in response to a verification request from another device.

FIG. 1 illustrates communication system 10 in which interworking device 50 has been installed. Communication system 10 provides communication service to networked devices operating within geographic areas associated with communication system 10. Communication system 10 may include one or more networked devices. Communication system 10 may support communication of any suitable type and/or in accordance with any appropriate communication standards including, but not limited to, any second generation ("2G"), third generation ("3G"), or fourth generation ("4G") standards, fifth generation ("5G") standards, or any suitable transitional generation standards (e.g., 2.5G, 2.75G, 3.5G, and 3.9G). Particular embodiments of communication system 10 may support communications in accordance with, for example, Global System for Mobile Communications ("GSM"), CDMAOne, General Packet Radio Service ("GPRS"), Enhanced Data rates for GSM Evolution ("EDGE"), CDMA2000, Integrated Digital Enhanced Network ("iDen"), Universal Mobile Telecommunications System ("UMTS"), Wideband Code Division Multiple Access ("WCDMA"), Long Term Evolution ("LTE"), Long Term Evolution Advanced ("LTE-Advanced"), Wi-Fi, Voice over Internet Protocol ("VoIP"), and/or Worldwide Interoperability for Microwave Access ("WiMAX") communication standards.

Source network 20 facilitates communications between components in communication system 10, such as networked devices. This disclosure contemplates any suitable source network 20 operable to facilitate communication between networked devices, which may operate within source network 20. Source network 20 may include any interconnecting system capable of transmitting audio, video, signals, data, messages, or any combination of the preceding. Source network 20 may include all or a portion of a public switched telephone network ("PSTN"), a public or private data network, a local area network ("LAN"), a metropolitan area network ("MAN"), a wide area network ("WAN"), a local, regional, or global communication or computer network, such as the Internet, a wireline or wireless network, an enterprise intranet, or any other suitable communication link, including combinations thereof, operable to facilitate communication between networked devices.

A networked device is a communication device being used by a caller through communication system 10. A networked device may be any type of networked device, including but not limited to a mobile device, a landline, a mobile network, an access network (including base stations and radio controllers), or a core network. A networked device may be implemented using any suitable type of processing system and may include any suitable combination of hardware, firmware, and software. A networked device may include one or more networked devices at one or more locations. Each networked device may include any appropriate number of input devices, output devices, mass storage media, processors, memory, or other suitable components for receiving, processing, storing, and communicating data. For example, each networked device may include a personal computer, workstation, network computer, kiosk, wireless data port, personal digital assistants ("PDAs"), one or more Internet Protocol ("IP") telephones, smart phones, table computers, one or more servers, a server pool, one or more processors within these or other devices, or any other suitable processing device capable of receiving, processing, storing, and/or communicating information with other components of communication system 10. A networked device may be a stand-alone computer or may be a part of a larger network of computers associated with an entity. A networked device may also be a SIM box, an analog telephone adaptor ("ATA"), or a Private Branch eXchange ("PBX"). Moreover, multiple networked devices may exist in a SIM box. A networked device may include physical devices, vehicles, home appliances, or other items embedded with network connectivity capable of exchanging data as part of the internet of things ("IoT").

A networked device may be associated with a subscriber identifier and a hardware identifier. The subscriber identifier identifies the user and/or SIM of a networked device. For example, a subscriber identifier may comprise a mobile identifier number ("MIN"), mobile subscriber identification number ("MSIN"), integrated circuit card ID ("ICC-ED"), international mobile subscriber identifier ("IMSI"), or mobile subscriber international ISDN number ("MSISDN"). Similarly, a hardware identifier identifies the hardware of a networked device. For example, a hardware identifier may comprise an International Mobile Station Equipment Identity ("IMEI"), electronic serial number ("ESN"), or a mobile equipment identifier ("MEID").

Source network 20 may include a mobile network implemented using any suitable type of processing system, including any suitable combination of hardware, firmware, and software. In certain embodiments, a mobile network may comprise networked devices, an access network, and/or a core network. In certain embodiments, a mobile network may be a networked device. A mobile network may include one or more networked devices at one or more locations. A mobile network may represent or include a radio access networks and/or any elements responsible for providing a radio or air interface to a networked device and/or other elements of communication system 10. Source network 20 may represent or include a radio access network and/or any elements responsible for providing a radio or air interface for a core network. For example, an source network 20 may include base stations and radio controllers. Source network 20 may also comprise mobility services edge ("MSE") routers. Networked devices may communicate within source network 20 over a communication link on the radio access network. In certain embodiments, an source network 20 may support Integrated Services Digital Network ("ISDN") access signaling. ISDN may include a set of communication standards for simultaneous digital transmission of voice, video, data, or other network service.

Source network 20 routes voice and/or data communicated by networked devices to other networked devices. In particular embodiments, source network 20 may include a backbone network and any backhaul elements connecting an access network to the backbone network. Source network 20 may support any appropriate standards or techniques for routing such communications. For example, in embodiments of source network 20 that support GSM or UMTS, source network 20 may include a Mobile Application Part ("MAP") core network, while in embodiments of source network 20 that support CDMA2000, source network 20 may represent an IS-41 core network. Additionally, source network 20 may also be responsible for aggregating communication for long haul transmission, authenticating users, managing user mobility, providing call control, billing, or other functionality associated with providing communication services to networked devices. In particular embodiments, source network 20 may include separate subnetworks for circuit-switched and packet-switched communication. For example, in embodiments that support GSM communication, source network 20 may include a network switching subsystem and any mobile switching centers ("MSCs") for providing circuit-switched services, as well as a GPRS core network and any Gateway GPRS Support Nodes ("GGSNs") and Serving GPRS Support Nodes ("SGSNs") for providing packet-switched services. In general, source network 20 may include any components suitable for routing and supporting voice and/or data communications for networked devices.

In certain embodiments, source network 20 may support Customized Applications for Mobile Networks Enhanced Logic ("CAMEL") protocol. The CAMEL protocol is a set of standards designed to work on either a GSM or UMTS network. When a CAMEL-enabled subscriber registers with source network 20, source network 20 transfers CAMEL subscription information ("CSI") to networked devices that need the information to provide CAMEL service to the subscriber. Network traffic through the CAMEL protocol may be referred to as on-network or off-network traffic. Further detail on the CAMEL protocol is available from standards documents (see, e.g., 3GPP TS 23.078 and 3GPP TS 29.078).

Moreover, source network 20 may also support the ISDN User Part ("ISUP") protocol. The ISUP protocol defines a set of procedures and messages. The ISUP protocol may provide core network signaling and may be compatible with both ISDN and non-ISDN traffic. Network traffic through the ISUP protocol may be referred to as on-network or off-network traffic. The ISUP protocol may use circuit identification code ("CIC") to set up calls from a networked device on source network 20. The CIC may be used between subscribers on a telephone exchange to enable a network device to signal call-related information using ISUP messages. For example, the CIC signaled information may include the called party number, calling party number, and where the voice part of a call is carried.

Source network 20 may also support the Narrowband ISDN User Part ("N-ISUP") protocol. The N-ISUP protocol defines a set of procedures and messages. The N-ISUP protocol may provide core network signaling and may be compatible with both ISDN and non-ISDN traffic. Network traffic through the N-ISUP protocol may be referred to as off-network traffic. The N-ISUP protocol may use Bearer-Independent Call Control ("BICC") as a signaling protocol. The BICC protocol may also be compatible with ISUP protocol. The BICC may be used for interconnecting nodes that provide call service function and bearer control function and may be used to setup bearer paths for call transport links of a networked device on source network 20. The transport links may be IP or asynchronous transfer mode ("ATM").

In certain embodiments, source network 20 may support session initiation protocol ("SIP") as a communications protocol for signaling and controlling multimedia communications sessions. For example, source network 20 may use SIP to control instant messaging, video calls, and VoIP communications. SIP may define the format of messages exchanged and the sequence of communications of a networked device and a core network. In some embodiments, the SIP and ISUP protocols may be compatible to enable ISUP messages to be transported over SIP networks.

In certain embodiments, source network 20 may include subnetworks using different signaling or communication protocols and permit communications across multiple signaling protocols. For example, source network 20 may support ISUP protocol to signal call-related information as well as session initiation protocol ("SIP") to signal and control multimedia communications sessions. As another example, source network 20 may support CAMEL protocol to transfer CAMEL subscription information ("CSI") as well as session initiation protocol ("SIP"). Source network 20 may permit information originating or received via the ISUP or CAMEL protocols to be modified or converted for routing in SIP networks, and source network 20 may support the use of CAMEL features for an IP multimedia core network. In certain embodiments, modification or conversion of information (e.g., CAMEL subscription information, communications, or communication requests) may include the results of applying policy rules to characteristics of the information.

Source gateway 30 may represent any suitable network component that passes signaling information between source network 20 and external networks. For example, source gateway 30 may be a session border controller or transition gateway including an interconnection border control function (IBCF). In certain embodiments, source gateway 30 may be a signaling gateway (SGW) or a signal transfer point (STP). Source gateway 30 may permit signaling between source network 20 and SS7, PSTN, TDM, and IP networks. In certain embodiments, source gateway 30 may be a media gateway (MGW) that performs integrated signaling functions, such as passing a communication request according to ingress signaling protocol 40 to interworking device 50, as shown in FIG. 1. For example, source gateway 30 may include a media gateway control function (MGCF). Source gateway 30 may transmit a communication request to interworking device 50, either directly or indirectly via intermediate devices (e.g., routers or switches), according to an ingress signaling protocol 40.

Interworking device 50 may receive a communication request according to ingress signaling protocol 40. Ingress signaling protocol 40 may include any suitable protocol for performing signaling over a network. For example, ingress signaling protocol 40 may be CAMEL protocol, SIP protocol, ISUP protocol, N-ISUP protocol, Sigtran protocol, the BICC protocol, the Diameter protocol, Location Services Protocols, TCP/IP protocol, UDP protocol, a TDM protocol, and/or any other valid protocol for circuit- or packet-switched networks. Interworking device may receive a communication request according to ingress signaling protocol 40 directly from source gateway 30 or indirectly after routing through intermediate devices (e.g., routers or switches).

Interworking device 50 may represent any suitable network component that facilitates: (1) applying one or more policy rules to one or more characteristics associated with a communication request; (2) when receiving a communication request, communicating (e.g., with an additional initial address message, or "IAM") to a networked device associated with the caller information received with the communication request; (3) verifying caller information with a certification procedure; (4) converting communications requests to different signaling protocols; and/or (5) obtaining and converting between indicators (e.g., authenticators, signatures, or certificates) associated with different certificate management or call validation procedures. Interworking device 50 may include a network server, any suitable remote server, a mainframe, a host computer, a workstation, a web server, a personal computer, a file server, or any other suitable device operable to communicate with computers. In some embodiments, interworking device 50 may execute any suitable operating syste such as IBM's zSeries/Operating System ("z/OS"), MS-DOS, PC-DOS, MAC-OS, WINDOWS, UNIX, OpenVMS, or any other appropriate operating systems, including future operating systems. The functions of interworking device 50 may be performed by any suitable combination of one or more servers or other components at one or more locations. In the embodiment where the components are servers, the servers may be public or private servers, and each server may be a virtual or physical server. The server may include one or more servers at the same or at remote locations. Also, interworking device 50 may include any suitable component that functions as a server.

Moreover, for additional security, interworking device 50 may encrypt communication to the requesting user. Similarly, a user may encrypt communication to source network 20, source gateway 30, and/or interworking device 50. Destination network 80, destination gateway 70, and/or interworking device 50 may encrypt communication to a user. The encryption is used to protect the communication in transit from a device in communication system 10 to another device in communication system 10. Example encryption methods include Diffie-Hellman key exchange, Rivest-Shamir-Adleman ("RSA") algorithms, or protocols such as Secure Shell ("SSH"), Secure/Multipuporse Internet Mail Extensions ("S/MIME"), Advanced Encryption Standard ("AES"), Secure Sockets Layer ("SSL"), and Transport Security Layer ("TSL"). Interworking device 50, requesting user, or any number of elements in communication system 10 may contain the decryption key to decrypt the encrypted communication.

In certain embodiments, interworking device 50 receives a communication request. A communication request comprises a request to communicate with one or more networked devices. A communication request may precede the communication, may be a header to the communication, may be the communication itself, or any other type of message to indicate that a request for communication has been made. The communication request may occur in real-time with the communication. In certain embodiments, the communication and/or communication request is communicated using the CAMEL protocol, the ISUP protocol, the SIP protocol, Sigtran protocol, the BICC protocol, the Diameter protocol, the TCAP protocol, the GSM_MAP protocol, TCP/IP protocol, UDM protocol, a TDM protocol, Location Services protocols, and/or any other valid telecommunications protocol for circuit- or packet-switched networks. Moreover, the communication and/or communication request may be sent in on-network traffic and/or off-network traffic. In certain embodiments, source network 20 communicates a request to interworking device 50 to authorize or validate the communication. In alternate embodiments, interworking device 50 automatically receives the information to determine whether to authorize or validate the communication. For example, source gateway 30 may route a communication request including caller information to interworking device 50.

The communication request may occur in real-time with the communication. Before the communication takes place or while the communication is taking place, interworking device 50 may implement policy rules to determine the action to take on the communication request and/or the communication itself. For example, the policy rule may instruct interworking device 50 to hold the communication until an additional authorization is provided. In an exemplary embodiment, the communication is routed with the communication request to the interworking device 50, and then interworking device 50 may route the communication to its next routing point after determining whether to authorize the communication. Interworking device 50 may determine whether to authorize or validate the communication based on the results of applying certificate management or validation procedures to the communication request, and/or applying policy rules to other information relating to the communication or communication request (e.g., a subscriber or hardware identifier). For example, interworking device 50 may terminate a communication request based on a failed certificate validation. As another example, interworking device 50 may route the communication to its next routing point based on a validation procedure applying one or more policy rules.

Interworking device 50 may append authorization or validation information to a communication or communication request and/or store authorization or validation information. In certain embodiments, interworking device 50 may append a certificate, signature, or other authenticator to the communication or communication request before routing the communication to its next routing point. Interworking device 50 may also store a certificate, signature, or other authenticator and provide the stored information in response to requests for authorization or validation. For example, interworking device 50 may receive a communication or communication request via one signaling protocol, store caller information (e.g., including certificate management or validation information) based on the received communication or communication request, and provide stored caller information to a network upon a verification request. In certain embodiments, the signaling protocol for the verification request or provision of stored caller information may differ from the signaling protocol for the communication or communication request. Interworking device 50 may provide stored caller information, including a certificate, signature, or other authenticator, by appending the information to a verification request, appending the information to a communication or communication request, transmitting the information without attachment, or providing information indicating the location of a certificate, signature, or other authenticator on another network element.

In certain embodiments, interworking device 50 may facilitate, in coordination with other network elements, certification procedures for validating and verifying caller information. In certain embodiments, interworking device 50 may obtain caller information from other network elements. For example, interworking device 50 may obtain caller information, such a SIM information (e.g., MSISDN, subscriber location, subscribed services), from a home location register (HLR). In certain embodiments, network elements in source network 20 may certify a communication request routed toward a networked device in destination network 80. Network elements in destination network 80 may not be operable to receive and process certifications generated in source network 20. In certain embodiments, a networked device in destination network 80 may seek to verify caller information. For example, a mobile device in destination network 80 receiving a call containing a calling number from a local zip code may seek to verify that the call in fact originated locally. As another example, a networked device in destination network 80 may seek to verify that a received communication request originates from a networked device trusted by a service provider in source network 20. In certain embodiments, source network 20 and/or destination network 80 may rely on a trusted network element or network function, such as interworking device 50, to validate a communication request or specific caller information in a communication request.

In certain embodiments, certification procedures may include certificate management or validation procedures for cryptographic authentication (e.g., Signature-based Handling of Asserted information using toKENs ("SHAKEN") such as those based on X.509 certificate management standards and incorporated into the SHAKEN standards for telecommunications). Further detail on the SHAKEN standards is available from the governing bodies, including the Alliance for Telecommunications Industry Solutions and the SIP Forum and also from joint standards documents (ATIS-1000074, Signature-based Handling of Asserted Information using Tokens (SHAKEN); ATIS-1000080, Signature-based Handling of Asserted Information using Tokens (SHAKEN): Governance Model and Certificate Management). Interworking device 50 may facilitate any other suitable certification procedure compatible with source network 20 or destination network 80, including, for example AB Handshake, Seismic, STIR/MIXER, Blockchain, or any other suitable certificate management or validation procedures for cryptographic authentication.

In certain embodiments, certificate management or validation procedures for cryptographic authentication may include procedures that enable the authentication and assertion of a calling party by an originating service provider and the verification of the calling party by a terminating service provider. An originating service provider may have an authenticated relationship with a calling party, enabling the originating service provider to provide a verifiable mechanism to identify and trust an authorized or validated calling party. For example, a signature can be generated and appended to a communication at an originating service provider, then routed to a terminating service provider, at which point an associated public certificate can be used to validate the signature. In certain embodiments, the originating service provider may attest to different levels of trust based on its relationship with the calling party. For example, a service provider may attest that the calling party can be fully trusted based on direct authentication of the calling party and verification of the associated calling party number. As another example, a service provider may attest to some, but not all, information associated with a communication request, such as attesting to the caller but not the calling number. As yet another example, a service provider may attest to a network component routing the communication request (e.g., a gateway), but not to information in the communication request. Certificate management or validation procedures for cryptographic authentication may be used to determine the level of trust in the originating entity and the calling party information it asserts. In certain embodiments, interworking device 50 attests to different levels of trust based on certification procedures.

In certain embodiments, validation procedures may include applying one or more rules to characteristics associated with a communication request. For example, interworking device 50 may have associated a predefined number of past communications to the subscriber identifier and/or hardware identifier associated with a communication request, and interworking device 50 may take certain authorization or validation actions, such as assigning a level of trust to the communication request, based on characteristics of the past communications. In certain embodiments, interworking device 50 may employ both rules-based validation and certificate management or validation procedures for cryptographic authentication.

In certain embodiments, interworking device 50 performs interoperable authorization or validation procedures between different signaling protocols. Interworking device 50 may convert a communication request from one signaling protocol to a different signaling protocol. For example, interworking device 50 may receive a communication request according to the SIP protocol, validate the communication request using STIR/SHAKEN, and convert the communication request to a different signaling protocol, such as the ISUP protocol. In this example, interworking device 50 may obtain an indicator compatible with ISUP protocol for providing validation information to network elements using the ISUP protocol. In certain embodiments, interworking device 50 may convert an indicator compatible with one signaling protocol for compatibility with a different signaling protocol. For example, interworking device may generate an indicator for SIP protocol and store the indicator, then generate another indicator for ISUP protocol based on information in the indicator for SIP protocol. Interworking device 50 may perform interoperable authorization or validation consistent with any suitable certification procedures. For example, interworking device 50 may validate a communication request received according to a TDM protocol based on applying policy rules to characteristics of the communication request and sign the communication request with a STIR/SHAKEN indicator for routing over the SIP protocol.

In certain embodiments, interworking device 50 may use an indicator (e.g., a certificate, signature, or other authenticator) to facilitate trusted communication. Interworking device 50 may receive an indicator, or information used to generate an indicator, from another network element (e.g., receive a STIR/SHAKEN token from a call placement service (CPS), a private key from a secure key store (SKS), or a public key from a certificate repository (CR)). Interworking device 50 may generate an indicator. For example, interworking device 50 may validate a communication request based on policy rules and generate an indicator for communicating to other network elements that the communication request is validated. In certain embodiments, interworking device 50 may append an authenticator to a message. For example, interworking device 50 may insert an authenticator into a communication request that is a header to a communication. As another example, interworking device 50 may append an authenticator as a header to a communication. In certain embodiments, interworking device 50 may store a certificate, signature, or other authenticator. In certain embodiments, interworking device 50 may transmit a certificate, signature, or other authenticator. For example, interworking device 50 may provide an authenticator in response to a verification request from another network element. In certain embodiments, interworking device 50 may receive a verification request from another network element seeking to verify a communication or communication request that has been routed to the network device. In certain embodiments, interworking device 50 may generate a certificate, signature, or other authenticator based on certificate management or validation procedures for cryptographic authentication or based on applying a rules-based validation procedure.

In certain embodiments, interworking device 50 may permit call validation across networks or network operators using different call certification procedures, including, for example, STIR/SHAKEN, AB Handshake, Seismic, STIR/MIXER, Blockchain, or any other suitable certificate management or validation procedures for cryptographic authentication. For example, a processor may receive a communication request via an international network using the CAMEL protocol, verify the call with AB Handshake, and route the communication request to a domestic SIP network. Accordingly, the interworking device 50 may act as a clearing house between networks or network operators.

In certain embodiments, interworking device 50 may obtain an indicator (e.g., a certificate, signature, or other authenticator) in response to receiving a communication or communication request. Interworking device 50 may obtain a certificate, signature, or other authenticator as a result of applying certificate management or validation procedures for cryptographic authentication. For example, interworking device 50 may receive a certificate from a certificate provisioning service or a verified signature from a verification service as part of certificate management or validation procedures. In certain embodiments, interworking device 50 may generate a certificate, signature, or other authenticator based on having an authenticated relationship with the calling party. In certain embodiments, interworking device 50 may generate a certificate, signature, or other authenticator based on the application of policy rules to a communication request. In certain embodiments, interworking device 50 may generate a certificate, signature, or other authenticator based on information it receives as part of certificate management or validation procedures.

In certain embodiments, interworking device 50 may obtain an initial indicator that includes information associated with a certificate management procedure. For example, interworking device may receive a STIR/SHAKEN certificate to verify a communication request. In certain embodiments, interworking device 50 may convert an initial indicator to another indicator. The other indicator may permit call validation according to a certificate management procedure different from the certificate management procedure associated with the initial indicator. For example, interworking device 50 may obtain an initial indicator for use in STIR/SHAKEN validation, then generate another indicator, or modify the initial indicator, for use in Seismic validation based on information included in the initial indicator.

In certain embodiments, interworking device 50 may receive verification requests from other network elements. A verification request from another network element may seek to verify a communication request that has been routed to the network element. For example, interworking device 50 may receive a communication request, store an indicator or caller information (e.g., including certificate management or validation information) based on the received communication request, and provide stored information to a network upon a verification request.

In certain embodiments, the certification procedure for the verification request or provision of stored information may differ from the certification procedure for the communication request or an initial indicator obtained in response to receiving the communication request. Interworking device 50 may permit interworking between different certification procedures. For example, interworking device 50 may receive a verification request from a network element that applies policy rules different than those used by interworking device to obtain an indicator, and interworking device 50 may apply the different policy rules to modify the indicator before providing the indicator in response to the verification request. As another example, interworking device may obtain an initial indicator for use in STIR/SHAKEN validation, then generate another indicator, or modify the initial indicator, for use in Seismic validation upon receipt of a verification request from a network device using Seismic validation.

In certain embodiments, interworking device 50 may facilitate or use a call placement service (CPS). CPS is a STIR/SHAKEN service for providing validation tokens across service providers. In certain embodiments, interworking device 50 may facilitate CPS by providing an indicator to CPS that another network element can use to sign or verify a communication request. For example, interworking device 50 may perform out-of-band service (OOBS). In certain embodiments, interworking device 50 may obtain information for certification procedures from CPS. For example, interworking device 50 may receive an indicator from CPS and use the received indicator to validate a communication request. In certain embodiments, interworking device 50 may use information received from CPS to generate an indicator.

In certain embodiments, interworking device 50 may perform authentication service or verification service. Interworking device 50 may perform an authentication service to validate originating communication requests. For example, an interworking device 50 located in a SIP source network 20 may receive and validate a communication request using STIR/SHAKEN and route the communication request for transit to destination network 80. Interworking device 50 may perform a verification service to verify terminating communication requests or communication requests in transit. For example, an interworking device 50 located in a TDM destination network 80 may receive a communication request via SS7 and verify the communication request via STIR/SHAKEN as part of a verification service.

As shown in FIG. 1, interworking device 50 may facilitate trusted communication between source network 20 and destination network 80. Source network 20 and destination network 80 may operate according to different signaling protocols (e.g., TDM and SIP), use different certification procedures (e.g., STIR/SHAKEN and AB Handshake), and rely on different service providers. Interworking device 50 may be connected to source network 20 via source gateway 30 such that interworking device receives communication requests from source network 20. Similarly, interworking device 50 may be connected to destination network 80 via destination gateway 70 such that interworking device transmits communication requests to destination network 80. Interworking device may be directly connected to source gateway 30 or destination gateway 70, or any number of intermediate devices may connect interworking device 50 to source gateway 30 or destination gateway 70. Intermediate devices may operate according to different signaling protocols.

Although shown in FIG. 1 as located between source network 20 and destination network 80, interworking device may operate at any suitable location for performing interworking functions in communication network 10. In certain embodiments, interworking device 50 may be located in source network 20 or destination network 80. For example, destination network 80 may operate according to a TDM protocol, and interworking device 50 in destination network 80 may convert between TDM, ISUP, and/or SIP protocols to perform certification procedures applying STIR/SHAKEN to communications in destination network 80. The components of interworking device 50 may be integrated or separated. In certain embodiments, components of interworking device 50 may be located on separate network elements. For example, a network interface of interworking device 50 may be located for receiving and routing communication requests between source gateway 30 and destination gateway 70, but connected over a network to processors and databases implementing certification procedures.

Destination gateway 70 may represent any suitable network component that passes signaling information between external networks and destination network 80. For example, destination gateway 70 may be a session border controller or transition gateway including an interconnection border control function (IBCF). In certain embodiments, destination gateway 70 may be a signaling gateway (SGW). Destination gateway 70 may permit signaling between destination network 80 and SS7, PSTN, TDM, and IP networks. In certain embodiments, destination gateway 70 may be a media gateway (MGW) that performs integrated signaling functions, such as receiving a communication request from interworking device 50 according to egress signaling protocol 60, as shown in FIG. 1. For example, destination gateway 70 may include a media gateway control function (MGCF). Destination gateway 70 may include any components or functionality included in or performed by source gateway 30, but as shown in FIG. 1, source gateway 30 transmits a communication request to interworking device according to an ingress signaling protocol 40, while destination gateway 70 transmits a communication request to interworking device according to an egress signaling protocol 60. In certain embodiments, destination gateway 70 and source gateway 30 may not perform the same signaling functionality. For example, destination gateway 70 may permit a SIP destination network 80 to receive communications from external TDM networks while source gateway 30 permits TDM source network 20 to transmit communications to external SIP networks. Destination gateway 70 may receive a communication request from interworking device 50, either directly or indirectly via intermediate devices (e.g., routers or switches), according to an egress signaling protocol 60.

Interworking device 50 may transmit a communication request according to egress signaling protocol 60. Egress signaling protocol 60 may include any suitable protocol for performing signaling over a communications network. For example, ingress signaling protocol may be CAMEL protocol, SIP protocol, ISUP protocol, N-ISUP protocol, or a TDM protocol. Interworking device may transmit a communication request according to egress signaling protocol 60 directly to destination gateway 70 or indirectly after routing through intermediate devices (e.g., routers or switches). In certain embodiments, egress signaling protocol 60 may be a different signaling protocol than ingress signaling protocol 40. Interworking device 50 may convert a communication request received according to ingress signaling protocol 40 to egress signaling protocol 60. In certain embodiments, interworking device 50 may transmit a communication request according to egress signaling protocol 60 in response to a verification request. Interworking device 50 may perform interworking functions, including certification procedures (e.g., certificate management procedures or call validation procedures), application of policy rules, and obtaining indicators for call certification, before or after converting a communication request to egress signaling protocol 60.

Certain embodiments may employ features of relevant signaling protocols (e.g., CAMEL, ISUP, DIAMETER) across both circuit-switched networks and packet-switched networks. For example, a communication originating under CAMEL protocol may be routed via a circuit-switched network to a network interface of interworking device 50, at which a processor performs certificate validation and routes the communication via SIP to its destination in a packet-switched network.

Destination network 80 facilitates communications between components in communication system 10, such as networked devices. This disclosure contemplates any suitable destination network 80 operable to facilitate communication between networked devices, which may operate within destination network 80. Destination network 80 may include any interconnecting system capable of transmitting audio, video, signals, data, messages, or any combination of the preceding. Destination network 80 may include all or a portion of a public switched telephone network ("PSTN"), a public or private data network, a local area network ("LAN"), a metropolitan area network ("MAN"), a wide area network ("WAN"), a local, regional, or global communication or computer network, such as the Internet, a wireline or wireless network, an enterprise intranet, or any other suitable communication link, including combinations thereof, operable to facilitate communication between networked devices.

Destination network 80 may contain any features or functions described above with respect to source network 20 to facilitate communications between networked devices. For example, destination network 80 may support any suitable signaling protocol, such as CAMEL protocol, ISUP protocol, N-ISUP protocol, SIP protocol, a TDM protocol, and/or any other valid protocol. Destination network 80 may contain different features or functions than source network 20. In certain embodiments, destination network 80 may operate according to a different signaling protocol, use a different certification procedure, or support a different service provider than source network 20. For example, source network 20 may support CAMEL protocol and use AB Handshake for certificate management, and destination network 80 may support SIP protocol and use STIR/SHAKEN for certificate management. As another example, a service provider operating in destination network 80 may employ different rules for attesting or verifying communication requests than the rules employed by a service provider in source network 20. Interworking device 50 may create or modify policy rules based on rules employed in source network 20 or destination network 80. Destination network 80 may inform interworking device 50 of the rules in destination network 80 a verification request. In certain embodiments, interworking function 50 may provide source network 20 or destination network 80 rules employed by interworking function 50, or rules in an external network, in response to a verification request. As shown in FIG. 1, interworking device 50 receives a communication request from source network 20 and transmits a communication request to destination network 80.

Modifications, additions, or omissions may be made to communication system 10 without departing from the scope of the disclosure. For example, communication system 10 may include any number of networked devices, access networks, core networks, and interworking devices 50. Network devices and networks within communication system 10 may use any number of signaling protocols, certification procedures, and network topologies.

Figure 2:
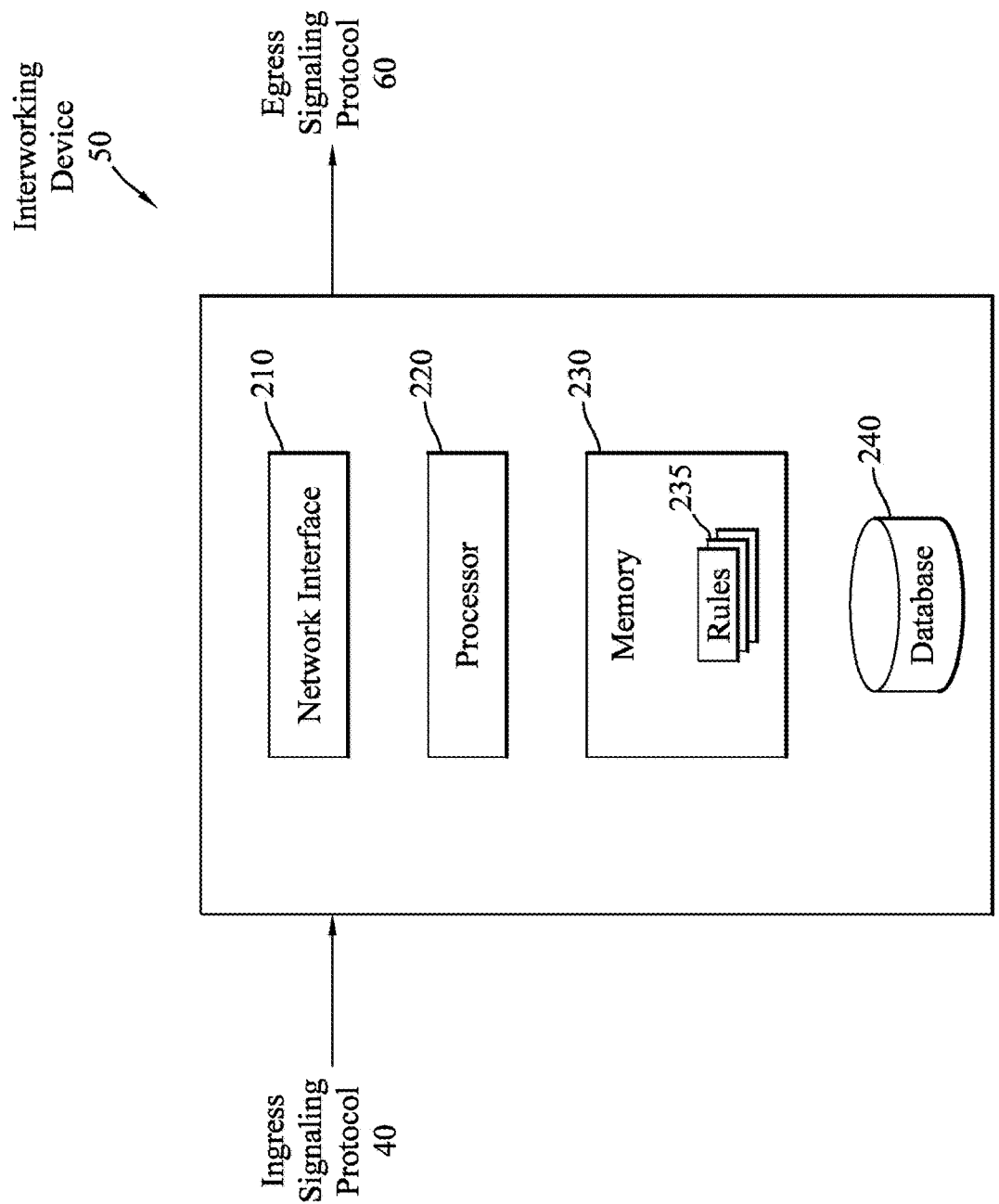
FIG. 2 is a block diagram showing in greater detail the contents of the interworking device according to particular embodiments.

FIG. 2 is a block diagram showing in greater detail the contents of interworking device 50 according to particular embodiments. As shown, interworking device 50 includes network interface 210, processor 220, memory 230, and database 240.

Network interface 210 facilitates communication between processor 220 and devices external to interworking device 50, or between other components of interworking device 50 and components of communication system 10 over a network. Network interface 210 may facilitate communication over portions of source network 20, destination network 80, or over a separate data network. In particular embodiments, network interface 210 includes or represents one or more network interface cards ("NICs"). Network interface 210 may facilitate communication over circuit-switched subnetworks, packet-switched subnetworks, or both types of subnetworks. In certain embodiments, network interface may facilitate communication between circuit-switched and packet-switched networks.

In certain embodiments, network interface 210 may be operable to receive communication requests according to ingress signaling protocol 40. For example, network interface 210 may receive a communication request according to a TDM protocol. In certain embodiments, network interface 210 may be operable to transmit communication requests according to egress signaling protocol 60. For example, interworking device 50 may convert a received TDM signal to a SIP signal and route the signal to another network element via network interface 210.

In certain embodiments, network interface 210 may communicate with a call placement service (CPS) to facilitate call validation or certificate management procedures, as described above with respect to FIG. 1. Network interface 210 may be operable to facilitate any suitable communications for performing certification procedures described above with respect to FIG. 1. For example, network interface 210 may receive or provide indicators for call validation or certificate management procedures. As another example, network interface 210 may receive verification requests from other network elements and provide an indicator or caller information in response to verification requests.

Processor 220 may represent or include any form of processing components, including dedicated microprocessors, general-purpose computers, or other devices capable of processing electronic information. Examples of processor 220 include field-programmable gate arrays ("FPGAs"), programmable microprocessors, digital signal processors ("DSPs"), application-specific integrated circuits ("ASICs"), and any other suitable specific- or general-purpose processors. Although FIG. 2 illustrates, for the sake of simplicity, an embodiment of interworking device 50 that includes a single processor 220, interworking device 50 may include any number of processors 220 configured to interoperate in any appropriate manner. For example, in particular embodiments, interworking device 50 may include three field programmable gate arrays configured to: (1) apply one or more policy rules to one or more characteristics associated with a communication request; (2) when receiving a communication request, communicating an additional message (e.g., an initial address message) to the networked device associated with the caller information received with the communication request; (3) verifying caller information with a certification procedure; (4) converting communications requests to different signaling protocols; and/or (5) obtaining and converting between indicators (e.g., authenticators, signatures, or certificates) associated with different certificate management or call validation procedures.

In certain embodiments, processor 220 may facilitate, in coordination with other network elements, certification procedures described above with respect to FIG. 1. Processor 220 may implement call validation procedures by applying policy rules to characteristics of a communication request. Processor 220 may implement, in coordination with other network elements, certificate management or validation procedures for cryptographic authentication, such as STIR/SHAKEN, AB Handshake, SEISMIC, STIR/MIXER, Blockchain, or any other suitable certificate management or validation procedures for cryptographic authentication.

In certain embodiments, processor 220 may convert a received communication request from one signaling protocol to a different signaling protocol. Similarly, processor 220 may convert a verification request from one signaling protocol to a different signaling protocol. In certain embodiments, processor 220 may route a verification request to other network elements for verification. Processor 220 may perform a certificate management procedure or a call validation procedure either before or after converting a communication request from one signaling protocol to a different signaling protocol. In certain embodiments, processor 220 may convert a received communication request to an egress signaling protocol 60 and generate an indicator based on a certificate management or validation procedure for cryptographic authentication associated with the egress signaling protocol 60. For example, processor 220 may receive a communication request according to a TDM protocol, convert the communication request to SIP protocol, and generate a STIR/SHAKEN indicator for validating the converted communication request in a SIP network.

Processor 220 may obtain an indicator as part of certification procedures described above with respect to FIG. 1. In certain embodiments, processor 220 may receive an indicator from another network element. For example, processor 220 may receive a STIR/SHAKEN certificate as part of a certificate management procedure. In certain embodiments, processor 220 may generate an indicator. For example, processor 220 may sign a communication request as trusted based on applying policy rules to characteristics of the communication request. Processor 220 may attach an indicator to a communication or communication request and/or store the indicator. In certain embodiments, processor 220 may sign the communication request and attach information (e.g., a certificate, signature, authenticator, or other indicator) relating to certificate management procedures or call validation to a communication request as a characteristic for consideration at another routing point in the network. In certain embodiments, the processor may sign or certify a communication request by appending or modifying an overhead portion of a communication request. For example, the processor may compute a digital signature and add the digital signature into a header or preamble. As another example, the processor may add an identifier referring to the location of a signature or certificate into a header or preamble. In certain embodiments, processor 220 may convert or modify an indicator for use with one certificate management procedure (e.g., STIR/SHAKEN) to an indicator for use with a different certificate management procedure (e.g., SEISMIC).

Memory 230 stores processor instructions, filter parameters, routing information, and/or any other data utilized by interworking device 50 during operation. Memory 230 may comprise any collection and arrangement of volatile or non-volatile, local or remote devices suitable for storing data, such as random access memory ("RAM"), read only memory ("ROM"), magnetic storage, optical storage, or any other suitable type of data storage components. Although shown as a single element in FIG. 2, memory 230 may include one or more physical components local to or remote from interworking device 50. Memory 230 may include rules 235.

Rules 235 may include logic, rules, algorithms, code, tables, and/or other suitable instructions embodied in a computer-readable storage medium. Rules 235 may comprise a set of policy rules. In certain embodiments, interworking device 50 may implement policy rules to determine a variety of actions (e.g., terminate, connect, hold, validate) to apply to a communication request. The variety of actions and/or the determination of the variety of actions to apply may occur in real-time or near real-time to when a communication request is communicated from a networked device. Processor 220 may access rules 235 in applying policy rules to determine the action to apply to a communication request, including, for example, actions facilitating a certification procedure described with respect to FIG. 1. As an example, rules 235 may contain a policy rule such that a communication request associated with a subscriber identifier that previously communicated ten consecutive short duration calls should be terminated. As another example, rules 235 may contain a policy rule that a communication request should be terminated if certificate validation is unsuccessful. In certain embodiments, processor 220 may apply policy rules to characteristics of a communication request to determine whether to validate a communication request as part of certificate management procedures. For example, interworking device 50 may decline to provide STIR/SHAKEN authentication to a communication request associated with a subscriber identifier that previously communicated ten consecutive short duration calls. Rules 235 may apply across some, all, or none of the interworking device 50.

Interworking device 50 may determine characteristics of the communication request to facilitate applying policy rules and/or certification procedures. In certain embodiments, interworking device 50 associates characteristics from the communication request to the subscriber identifier associated with the communication request. In certain embodiments, interworking device 50 may also relate characteristics associated with the communication request to the called party number, the calling party number, the time of the call, the date of the call, and/or the calling party sub-address. Interworking device 50 may also relate characteristics associated with the communication request to the hardware identifier, or may relate the characteristics to both the subscriber identifier and the hardware identifier. Interworking device 50 may determine characteristics in a myriad of ways. Certain characteristics, such as the subscriber identifier, hardware identifier, and destination of the communication, may be determined from the communication and/or communication request. In addition, interworking device 50 may look at past call detail records ("CDRs") to determine previous data records associated with the subscriber identifier and/or hardware identifier to identify characteristics of the communication request. For example, CDR may contain information of the party originating the communication, the party receiving the communication, the start time of the call, the end time of the call, the call duration, the cost of the communication, the billing phone number that is charged for the call, an identification of additional digits entered after the call was connected, whether the call was successfully connected, call type (e.g., SMS, VoIP, or voice), fault conditions encountered on the call, the routing of the call (e.g., Switch ID or Visitor Location Register ("VLR")), data communicated on call, or any other type of information or characteristics related to a communication. In certain embodiments, interworking device 50 may associate a predefined number of past communications to the subscriber identifier and/or hardware identifier. Interworking device 50 may also analyze characteristics associated with elements in a mobile network or in communication systems 10. For example, interworking device 50 may determine the utilization and/or load of a networked device in communication system 10.

Interworking device 50 may determine whether the characteristics meet any of the policy rules. The policy rules are rules that determine what type of action interworking device 50 should take on a communication request or what type of action interworking device 50 should take in response to a communication request. Interworking device 50 may apply policy rules to the one or more characteristics associated with the communication request to determine the type of action to apply to the communication request. Policy rules consist of any type of rules, logic, algorithms, code, and instructions to determine what type of action interworking device 50 should apply to the communication request. For example, policy rules may indicate that a communication request should be terminated if: the subscriber has placed a number of consecutive short duration calls to premium-rate telephone numbers, a maximum amount of termination fees accrued by a subscriber has been reached, the count of hardware identifiers associated with the subscriber identifier exceeds a subscriber identifier threshold, the count of hardware identifiers associated with the subscriber identifiers exceeds a hardware identifier threshold, the networked device purporting to be placing the communication request does not respond to an IAM, the networked device purporting to be placing the communication request is not active or is not "busy," or any other logic, algorithm, policy, or rules that allows interworking device 50 to determine the type of action to take for a communication request. As another example, policy rules may indicate that a communication request should be terminated if certificate validation fails. In certain embodiments, interworking device 50 may generate an indicator based on applying policy rules to a communication request. For example, applying policy rules may result in a rating (such as A, B, or C) that indicates the level of trust for the communication. Initial detection point may append an indicator to a communication or communication request and/or store the authenticator. In certain embodiments, interworking device 50 may append information relating to certificate management procedures or certificate validation (e.g., a certificate, signature, or other authenticator) to a communication or communication request as a characteristic for consideration at another routing point in the network.

The policy rules may be created and inputted by an authorized user or may be determined by interworking device 50 after performing statistical analysis. For example, interworking device 50 may determine that a networked device becomes overloaded during a certain period of the day. Interworking device 50 may change the strictness of the policy rules during those periods of the day. As another example, interworking device 50 may determine one or more policy rules to apply from a set of policy rules based in part on the one or more characteristics associated with the communication request. For example, if the communication request occurs during a weekend, interworking device 50 may select a certain subset of policy rules from the set of policy rules to apply to the communication request. As another example, if the communication request is associated with a flagged subscriber identifier or flagged hardware identifier, interworking device 50 may apply a certain subset of policy rules from the set of policy rules.

Based on the application of policy rules to the one or more determined characteristics, interworking device 50 may perform an action on the communication request. For example, the application of the policy rules may indicate that interworking device 50 terminate the communication request. As another example, the application of the policy rules may indicate that interworking device 50 completes the communication request or holds the communication request. Interworking device 50 may complete the communication request based on a successful certificate validation. In certain embodiments, interworking device 50 may append a certificate, signature, or other authenticator to a communication request or communication based on applying policy rules. In certain embodiments, interworking device 50 may comprise a default action, such as completing the request if one or more policy rules do not apply.

In certain embodiments, interworking device 50 is also able to determine if one or more of the determined characteristics is included on an exemption list. The exemption list may contain a list of one or more determined characteristics (e.g., subscriber identifier, hardware identifier, destination call number, and originating call time). The exemption list may be predefined by an administrator or automatically determined by interworking device 50. For example, interworking device 50 may place a networked device on the exemption list based on the type of networked device (e.g., a tablet is automatically included in the exemption list), a location associated with a networked device, or any other information such that interworking device 50 may make the determination on whether to place a networked device on the exemption list.

As an example embodiment of operation of implementing policy rules, interworking device 50 may terminate a communication request when the subscriber exceeds a subscriber identification threshold. A communication request may comprise information such that interworking device 50 may determine a subscriber identifier and a hardware identifier associated with a networked device. A communication request is a request to authorize communication from the networked device to its intended recipient. A communication request may be communicated during initialization of a communication, as part of the communication, or in any other form of communication. For example, a communication request may comprise a request from source network 20 for interworking device 50 to authorize a communication. Interworking device 50 may then determine whether the hardware identifier has previously been associated with the subscriber identifier. If the hardware identifier has previously been associated with the subscriber identifier, interworking device 50 may transmit a command to complete the communication request. Alternatively, interworking device 50 may complete the communication request from the networked device.

If the hardware identifier has not been previously associated with the subscriber identifier, interworking device 50 may add the hardware identifier to a list of hardware identifiers associated with the subscriber identifier. Interworking device 50 may also receive a list of hardware identifiers that are associated with the subscriber identifier, a count of hardware identifiers associated with the subscriber identifier, or any other information such that interworking device 50 receives information associated with the hardware identifiers associated with the subscriber identifier.

Similar to associating the hardware identifier to the subscriber identifier, interworking device 50 may associate the subscriber identifier to the hardware identifier. If the subscriber identifier has previously been associated with the hardware identifier, interworking device 50 may transmit a command to complete the communication request. Alternatively, interworking device 50 may complete the communication request from the networked device.

If the subscriber identifier has not been previously associated with the hardware identifier, interworking device 50 may add the subscriber identifier to a list of subscriber identifiers associated with the hardware identifier. Interworking device 50 may also receive a list of subscriber identifiers that are associated with the hardware identifier, a count of subscriber identifiers associated with the hardware identifier, or any other information such that interworking device 50 receives information associated with the subscriber identifiers associated with the hardware identifier.

In particular embodiments, interworking device 50 also determines if the subscriber identifier, hardware identifier, or both are included on an exemption list. The exemption list may contain a list of subscriber identifiers and hardware identifiers that are excluded from complying with the hardware identifier threshold. For example, a service provider may have a tester SIM card that is inserted into multiple mobile phone equipment for testing purposes, and, therefore, should not be subject to the hardware identifier threshold. If the subscriber identifier or hardware identifier is included in the exemption list, interworking device 50 may complete the communication request for a networked device. The exemption list may be predefined by an administrator or automatically determined by interworking device 50. For example, interworking device 50 may place a networked device on the exemption list based on the type of networked device (e.g., a tablet is automatically included in the exemption list), a location associated with a networked device, or any other information such that interworking device 50 may make the determination on whether to place a networked device on the exemption list.

Database 240 represents a database that stores, either permanently or temporarily, associated characteristics with a communication request from a network device. Database 240 includes any one or a combination of volatile or non-volatile local or remote devices suitable for storing information. For example, database 240 may include random access memory ("RAM"), read only memory ("ROM"), magnetic storage devices, optical storage devices, or any other suitable information storage device or a combination of these devices. Database 240 may include any suitable information for use in the operation of interworking device 50. Additionally, database 240 may be included within interworking device 50, rather than being a component external to interworking device 50. Database 240 may be located in interworking device 50, source network 20, destination network 80, other components of communication system 10, or any other location suitable for database 240 to communicate with interworking device 50. In certain embodiments, database 240 can be located in memory 230.

Database 240 may facilitate certification procedures implemented by interworking device 50. For example, database 240 may store an indicator generated by interworking device 50 as part of a certificate management procedure. As another example, database 240 may store characteristics of a communication request or other caller information used for call validation. In certain embodiments, database 240 may store information relating to other network elements for use in certification procedures. For example, database 240 may store information indicating that destination network 80 operates according to a TDM protocol and uses AB Handshake for certificate management, and database 240 may provide that information to processor 220 to facilitate certificate management or call validation procedures for communication requests in transit to destination network 80.

In particular embodiments, the structural components of interworking device 50 may be attached to one or more chassis for mounting in a standard nineteen-inch ("19") or twenty-three-inch ("23") electronic rack. As a result, interworking device 50 may represent a rack-mountable component that may be inserted into standard equipment racks commonly used to house telecommunications equipment in modern mobile communication systems, such as racks complying with EIA-310-D and/or EN 300 119. Thus, particular embodiments of interworking device 50 may be easily integrated with existing equipment in many types of mobile communication systems. Furthermore, in particular embodiments, the components used to provide the functionality described for interworking device 50 may be fit on a single chassis or a collection of chasses.

A component of interworking device 50 may include an interface, logic, memory, and other suitable elements. An interface receives input, sends output processes the input and/or output, and performs other suitable operations. For example, the interface may communicate an IAM to the networked device associated with the caller information included in the communication request. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to interworking device 50 without departing from the scope of the disclosure. For example, interworking device 50 may include any number of network interfaces 210, processors 220, memory 230, or databases 240. Furthermore, the components of interworking device 50 may be integrated or separated. For example, network interface 210, processor 220, memory 230, and database 240 may be incorporated into a single component.

Figure 3:
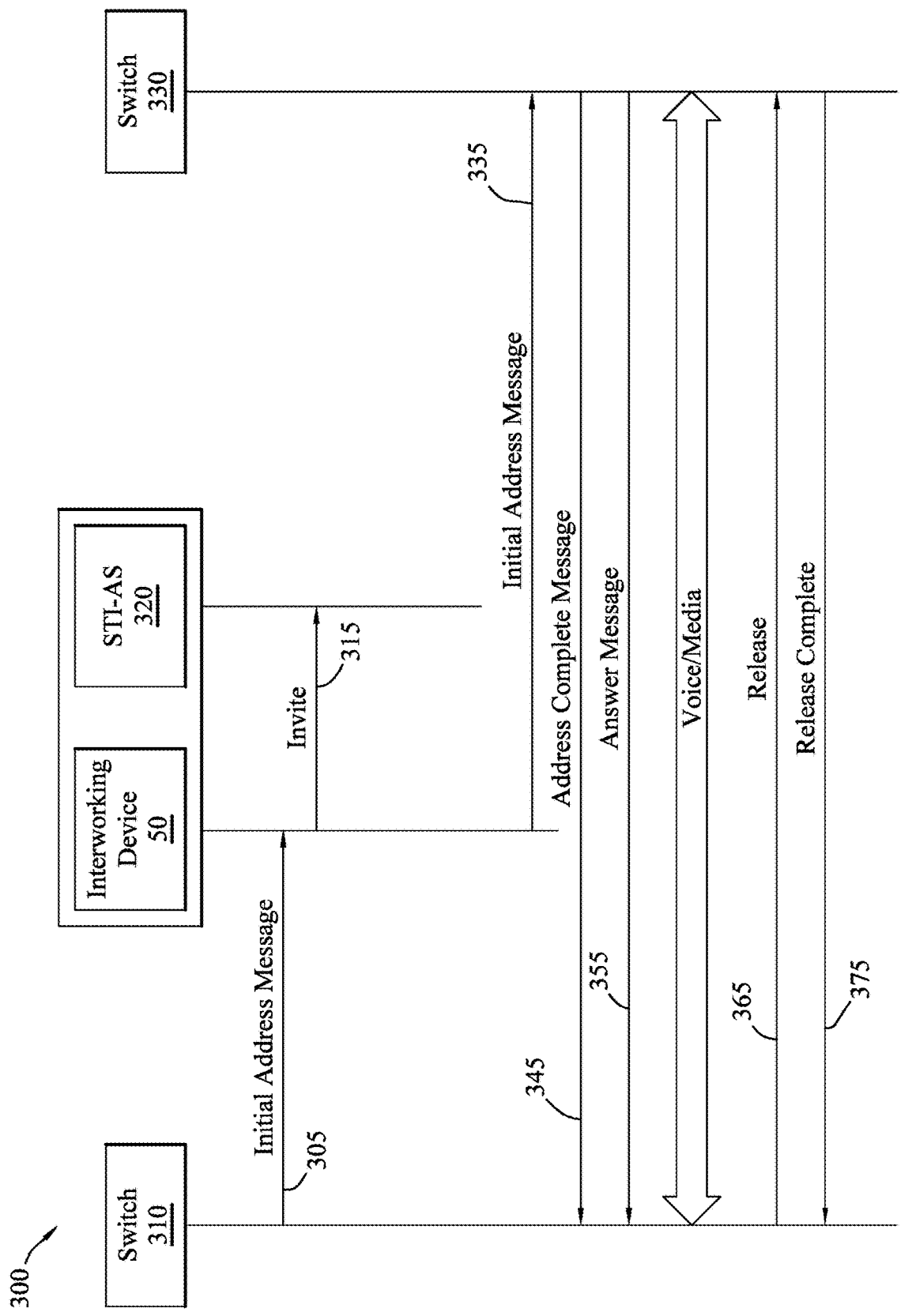
FIG. 3 illustrates an exemplary interaction diagram depicting the interaction that may occur between an interworking device and a communication system.

FIG. 3 illustrates an exemplary interaction diagram depicting interaction that may occur between interworking device 50 and components of communication system 10. The embodiment illustrated FIG. 3 is implemented on ISUP signaling systems to enable TDM communications. In certain embodiments, interworking device 50 may act as a service control function (SCF) or service control point (SCP) for initial setup of a call.

In certain embodiments, switch 310 communicates and interworking device 50 receives an initial address message (IAM) at step 305. In certain embodiments, switch 310 may be a class 4 switch. In certain embodiments, switch 310 may be a signal transfer point (STP). In certain embodiments, STI-AS 320 may be integrated with interworking device 50.

In certain embodiments, interworking device 50 verifies caller information with a certification procedure in response to receiving the IAM message. Interworking device 50 communicates and secure telephony identity authentication service 320 (STI-AS 320) receives an invite message at step 315. In certain embodiments, the invite message includes information resulting from the certification procedure. For example, interworking device 50 may generate an indicator based on a certificate management procedure and attach the indicator to the invite message. As another example, interworking device 50 may validate the call based on applying policy rules and attest to a level of trust. In certain embodiments, STI-AS 320 may provide validation information to a call placement service (CPS), not shown in FIG. 3. For example, STI-AS 320 may provide an indicator received in an invite message to CPS. STI-AS 320 may receive an acknowledgement from CPS and communicate the acknowledgement to interworking device 50.

In certain embodiments, once the call has been validated, the interworking device 50 continues signaling to complete the call. At step 335, interworking device 50 routes an initial address message (IAM) to switch 330. In certain embodiments, switch 330 may be a class 5 switch. In certain embodiments, the IAM message in step 335 may have been validated by interworking device 50. For example, interworking device 50 may sign one or more information elements in the IAM message (e.g., a calling party number) at step 335.

In certain embodiments, switch 330 continues signaling to complete the call upon receipt of the IAM message in step 335. In certain embodiments, switch 330 may continue signaling based on validation of the IAM message in step 335 by interworking device 50. For example, at step 345, switch 330 communicates and switch 310 receives an address complete message; at step 355, switch 330 communicates and switch 310 receives an answer message; at step 365. In certain embodiments, not shown in FIG. 3, switch 330 may communicate and interworking device 50 may receive a verification request. Switch 330 may communicate a verification request to interworking device 50 on receiving an IAM message that is not validated. In certain embodiments, interworking device 50 may respond to a verification request as described above with respect to FIGS. 1 and 2.

In certain embodiments, interworking function 50 redirects the IAM message to switch 300 during initial setup and does not remain in the signaling path after switch 330 receives the IAM message at step 335. For example, interworking device 50 may be removed from the signaling path by changing point codes in accordance with the SS7 signaling protocol. Dropping from the signaling path may advantageously reduce the load on interworking device 50 and permit efficient routing between switch 310 and switch 330. In certain embodiments, interworking function 50 may stay in the signaling path for all messaging to compete a call. For example, the address complete message (at step 345), answer message (at step 355), release message (at step 365), and release complete message (at step 375) may be routed to interworking function 50 on the path between switch 310 and switch 330. Remaining in the signaling path may advantageously permit interworking device 50 to collect characteristics of the communication request, caller information, or network elements associated with the communication request.

As shown in FIG. 3, the prevention of malicious calls may be implemented on ISUP signaling systems to enable TDM communications. It should be understood by one of skill in the art that these techniques may also be implemented and carried out under other signaling protocols, such as those discussed above with respect to FIG. 1. As shown in FIG. 3, interworking device 50 acts on signaling only, without affecting voice and media paths. FIG. 3 illustrates an exemplary interaction diagram for interworking with an authentication service for an originating service provider. It should be understood by one of skill in the art that these techniques may also be implemented and carried out for call verification services at a terminating service provider or as a communication request is in transit.

Figure 4:
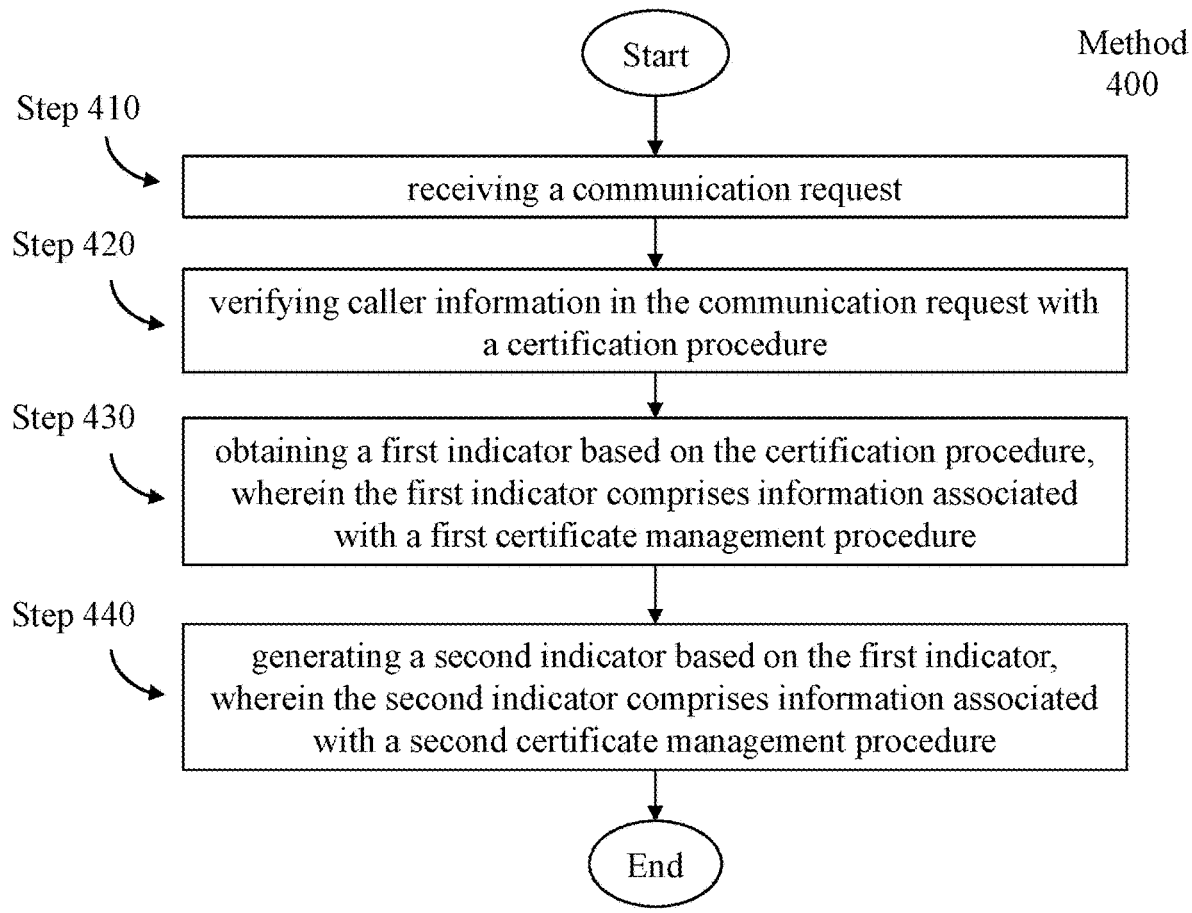
FIG. 4 is an exemplary flow diagram of a method for clearing house validation according to particular embodiments.

FIG. 4 is an exemplary flow diagram of a method for clearing house validation according to particular embodiments. Method 400 begins in step 410 when interworking device 50 receives a communication request. In certain embodiments, interworking device 50 may receive a communication request from a first network according to a first signaling protocol. In certain embodiments, a communication request comprises a request to communicate with one or more networked devices. A communication request may comprise any type of message to indicate that a request for communication has been made. For example, interworking device 50 may receive a communication request in response to a mobile device user requesting to establish a VOIP call with another mobile device user. In certain embodiments, interworking device 50 may receive a communication request according to CAMEL protocol, SIP protocol, ISUP protocol, N-ISUP protocol, the BICC protocol, the Diameter protocol, Location Services Protocols, a TDM protocol, and/or any other valid protocol for circuit- or packet-switched networks. For example, interworking device 50 may receive a communication request according to SIP protocol from an IP network. As another example, interworking device 50 may receive a communication request according to ISUP protocol from a TDM network.

In step 420, interworking device 50 verifies caller information in the communication request with a certification procedure. In certain embodiments, a certification procedure may comprise certificate management or validation procedures for cryptographic authentication. For example, interworking device 50 may, in coordination with other network elements, implement STIR/SHAKEN, AB Handshake, Seismic, STIR/MIXER, or Blockchain validation to verify caller information. In certain embodiments, a certification procedure may comprise a call validation procedure based on applying policy rules to characteristics of the communication request. For example, interworking device 50 may apply policy rules to validate a communication request and attest to a low level of trust based on certain characteristics of the communication request or caller information, such as a subscriber placing a number of consecutive short duration calls or a networked device purporting to be placing the communication request not being active or "busy."

In step 430, interworking device 50 obtains a first indicator based on the certification procedure. The first indicator includes information associated with a first certificate management procedure. For example, the first indicator may comprise a certificate for performing authentication according to STIR/SHAKEN procedures. In certain embodiments, the first indicator may indicate a selection between on or more ratings of trust in the communication request. For example, interworking device 50 may attest to a low level of trust based on certain characteristics of the communication request or caller information, such as a subscriber reaching or exceeding a maximum amount of termination fees, or a networked device purporting to be placing the communication request not being active or "busy." In certain embodiments, the first indicator may be a certificate, signature, or authenticator obtained as part of a certificate management or validation procedure for cryptographic authentication. In certain embodiments, interworking device 50 may obtain a first indicator based on communication with other network elements. In certain embodiments, interworking device 50 may generate a first indicator. For example, interworking device 50 may generate a first indicator based on call validation procedures applying policy rules to characteristics of a communication request or other caller information.

In step 440, interworking device 50 generates a second indicator based on the first indicator. For example, interworking device 50 may convert from a first indicator to a second indicator or modify the first indicator to generate the second indicator. The second indicator comprises information associated with a second certificate management procedure. For example, interworking device may obtain a first indicator for a STIR/SHAKEN procedure and generate a second indicator for a SEISMIC procedure. In certain embodiments, generating a second indicator may facilitate interworking between networks operating according to different signaling protocols, using different certification procedures, or relying on different service providers.

In certain embodiments, method 400 may further comprise an additional step in which interworking device 50 may generate a second indicator in response to a verification request received from another network element. In certain embodiments, interworking device 50 may generate a second indicator before receiving a verification request. For example, interworking device may generate a second indicator and store the second indicator or attach the second indicator to a communication request. In certain embodiments, interworking device 50 may generate a second indicator for use in a second certificate management procedure based on information contained in the verification request. For example, interworking device 50 may generate a second indicator for use in a second certificate management procedure based on associating the verification request with a second certificate management procedure. In certain embodiments, interworking device 50 may generate a second indicator for use in a second certificate management procedure based on the signaling protocol of the verification request. For example, interworking device 50 may generate a second indicator for use in a STIR/SHAKEN procedure based on receiving a verification request according to SIP protocol.

It should be understood by one of ordinary skill in the art that the embodiments listed encompass cellular calls, VoIP calls, Wi-Fi calls, internet video calls, and other IP-based calling systems. The functionality of the present disclosure will be similar on any communications system that provides a communication request and allows for call validation. For example, embodiments of the present disclosure may operate on VoIP based calls by using SIP identifiers of a communication request to perform MCID services.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
   a network interface operable to receive a communication request; and
   a processor communicatively coupled to the network interface and operable to:
      obtain a first indicator compatible with a first signaling protocol, wherein the first indicator indicates that caller information in the communication request has been verified according to a first certification procedure;
      generate a second indicator that is derived from the first indicator, wherein the second indicator is compatible with a second signaling protocol; and
      transmit the second indicator.

2. The apparatus of claim 1, wherein the processor is further operable to obtain the first indicator from the communication request.

3. The apparatus of claim 1, wherein the second indicator is associated with a second certification procedure.

4. The apparatus of claim 1, wherein the second indicator is generated after receiving a verification request.

5. The apparatus of claim 4, further operable to:
   determine the second signaling protocol in response to the verification request.

6. The apparatus of claim 1, wherein the processor is further operable to append the second indicator to the communication request before routing the communication request to its next routing point.

7. A method, comprising:
   obtaining a first indicator compatible with a first signaling protocol, wherein the first indicator indicates that caller information in a communication request has been verified according to a first certification procedure;
   generating a second indicator that is derived from the first indicator, wherein the second indicator is compatible with a second signaling protocol; and
   transmitting the second indicator.

8. The method of claim 7, wherein obtaining the first indicator further comprises obtaining the first indicator from the communication request.

9. The method of claim 7, wherein the second indicator is associated with a second certification procedure.

10. The method of claim 7, wherein the second indicator is generated after receiving a verification request.

11. The method of claim 10, further comprising:
   determining the second signaling protocol in response to the verification request.

12. The method of claim 7, wherein transmitting the second indicator further comprises appending the second indicator to the communication request before routing the communication request to its next routing point.

13. Non-transitory computer readable medium comprising logic, the logic, when executed by a processor, operable to:
   obtain a first indicator compatible with a first signaling protocol, wherein the first indicator indicates that caller information in a communication request has been verified according to a first certification procedure;
   generate a second indicator that is derived from the first indicator, wherein the second indicator is compatible with a second signaling protocol; and
   transmit the second indicator.

14. The non-transitory computer readable medium of claim 13, wherein obtaining the first indicator further comprises obtaining the first indicator from the communication request.

15. The non-transitory computer readable medium of claim 13, wherein the second indicator is associated with a second certification procedure.

16. The non-transitory computer readable medium of claim 15, wherein the second indicator is generated after receiving a verification request.

17. The non-transitory computer readable medium of claim 13, further operable to:
   determine the second signaling protocol in response to the verification request.

* * * * *